United States Patent [19]

Zuniga et al.

[11] Patent Number: 5,162,802

[45] Date of Patent: Nov. 10, 1992

[54] METHOD AND APPARATUS FOR TRACKING USING AN EFFICIENT GATING SCHEME

[75] Inventors: Miguel R. Zuniga, Greenbelt, Md.; J. Michael Picone, Falls Church; Jeffrey K. Uhlmann, Alexandria, both of Va.

[73] Assignee: The United States of America as represented by the Secretary of the Navy, Washington, D.C.

[21] Appl. No.: 693,469

[22] Filed: May 1, 1991

[51] Int. Cl.$^5$ .............................................. G01S 13/00
[52] U.S. Cl. ..................................................... 342/96
[58] Field of Search ............................ 342/96, 94, 95

[56] References Cited

U.S. PATENT DOCUMENTS

| | | | |
|---|---|---|---|
| 4,005,415 | 1/1977 | Kossiakoff et al. | 342/96 X |
| 4,151,523 | 4/1979 | Platt et al. | 342/96 X |
| 4,720,711 | 1/1988 | Quesinberry et al. | 342/96 |

Primary Examiner—Mark Hellner
Attorney, Agent, or Firm—Thomas E. McDonnell; Edward F. Miles

[57] ABSTRACT

A method and apparatus for reducing the calculations necessary to track a number of targets. The invention trades off the magnitude of search radius in parameter space against the number of extra copies made of the track data structure in a manner that inherently saves computation as the number of targets becomes large.

16 Claims, 1 Drawing Sheet

METHOD AND APPARATUS FOR TRACKING USING AN EFFICIENT GATING SCHEME

BACKGROUND OF THE INVENTION

This application pertains to the tracking of objects, and more particularly to the tracking of a large number of objects in a computationally efficient manner.

The tracking problem is essentially one of comparing two sets of information about the objects from two different times, and determining which information in one set corresponds to that in the other. For example, a radar tracking a plurality of aircraft scans the sky over a finite time $\tau$, and thereafter receives returns from the objects. The reports are in the form of data vectors, each element of each vector corresponding to a piece of information about the object whence came the report. For example, such a data vector will have one element for each of the spatial coordinates of the object, and can have such other information of interest as is available, such as doppler shift, luminescence, temperature, velocity, acceleration, etc. Generally, each report vector will have d elements, consisting of at least the spatial coordinates of its corresponding object, and each track vector will have l elements, consisting of at least the spatial coordinates and velocity components of the corresponding object, $l \geq d$.

With each new scan, a new set of reports are received, which must be paired with the existing tracking data vectors, called the track data structure. This pairing is done by comparing elements in the track data structure with those in the new reports at whose nodes according to a numerical scoring criterion is applied to each candidate pair. Unfortunately, the total number of these pairs is the number of data vectors in the track data structure, times the number of report vectors, this product being nominally the square of the number of objects being tracked. The computational cost of evaluating the scoring test for such a data pair is relatively high for many tracking problems of interest, such as air traffic or battle control. Moreover, the number of pairs which must be compared in the search data structure is $N_R N_T$, where $N_R$ is the number of reports, and $N_T$ is the number of tracks, a number which increases quadratically with the number of objects tracked. Thus increasing the number of objects to track can rapidly increase the computational demand beyond the limits of any computer.

To overcome this problem, prior workers typically use a very coarse, but computationally simple, criterion to prescreen the pairs of tracks and reports which have little likelihood of correspondence, and then subjecting only the pairs which "gate," i.e. survive this prescreening, the search tree and the more precise scoring test, sometimes referred to as the final gate. One way to do this is to select a radius in parameter space (the elements of the data vectors being the parameters of this space), and, for each track/report, score only those reports/tracks within the radius. Unfortunately, the finite nonzero scan time causes the reports to return at different times than they would if the scan occurred instantaneously. Because the objects have different and usually appreciable velocities, the reports are skewed in time. Thus to ensure that all legitimate pairs should pass the gate, the search radii might have to be so large as to largely offset the savings introduced by the gate. Significant attempts have been made to develop scanners having very short scan times. Unfortunately, producing such a controlled, high power, output is both difficult and expensive.

SUMMARY OF THE INVENTION

Accordingly, an object of the invention is to permit tracking in a manner whose computational complexity is inherently less than quadratic.

Another object is to improve the accuracy of tracking done using scanners, such as scanning radar antennas, without requiring faster scanning, or use of more scanning power.

Another object is to do the foregoing in a manner which is relatively straightforward to implement.

In accordance with these and other objects made apparent hereinafter, the invention is a method and apparatus for tracking a plurality of objects. A track data structure is established for the objects, the objects are scanned over a scan time $\tau$, and the reports of the objects are received responsive to the scan. An integer $M_D$ is selected, and the time $\tau$ is partitioned into $M_D$ subintervals. For each of at least two of the sub-intervals, one of these data structures is copied into the sub-interval, the members of the other data structure which are nearest in time to the copied data structure, as opposed to any of the other copies structure in any of the other sub-intervals, are identified. These near-neighbor reports are then associated with the members of the copied data structure.

Although typically the track data structure will be the copied structure, and the reports will then be associated with the copied track data structure, these data structures are symmetric for calculational purposes, and there is no reason in principle why one could not practice the invention by constructing the search structures form the set of reports rather than the set of tracks.

In another embodiment, the first data structure is projected to a time within the earliest sub-interval, the near neighbors determined and the first structure updated by association with the near neighbors, the updated first structure copied to the next sub-interval in time, and the process continued sequentially for all the sub-intervals. This embodiment is more suited to practice with a linear processing computer, whereas the embodiment discussed above is more suited to a parallel processor.

In particular embodiments, $M_D$ is chosen according to an optimal criterion, i.e.:

$$M_{DO} = (lK_2/K_1)^{1/(L+1)}$$

$$K_1 = N_T(C_e C_d \log N_T)$$

$$K_2 = N_R(C_{sc} + C_{SE})[\gamma(1)p/(l+1)](\alpha\tau/2)^L.$$

And the invention further displays the first data structure in human readable form, stores the first data structure, or operates logic circuity responsive to the first data structure.

The size of this volume depends on the distance in parameter space which one of the objects can travel between copies, which itself depends on object velocity. Sub-dividing the scan interval and copying and integrating the track data structure to each sub-interval decreases this time, and proportionally decreases the necessary search radius. However, the number of successful gates is proportional to the search volume, which depends exponentially in dimensionality on search radius. In this manner, although the computational cost of tracking according to the invention increases because of the extra cost of making extra copies of the tracks and setting up extra search structures for the extra tracks, the invention saves a disproportionately large computational cost by reducing the necessary search volumes for each copy.

The invention is more fully understood from the following detailed description of preferred embodiments, it being understood, however, that the invention is capable of extended application beyond the precise details of the preferred embodiments. Changes and modifications can be made that do not affect the spirit of the invention, nor exceed its scope, as expressed in the appended claims.

Accordingly, the invention is described with particular reference to the accompanying drawings, wherein:

DETAILED DESCRIPTION

Figure 1:
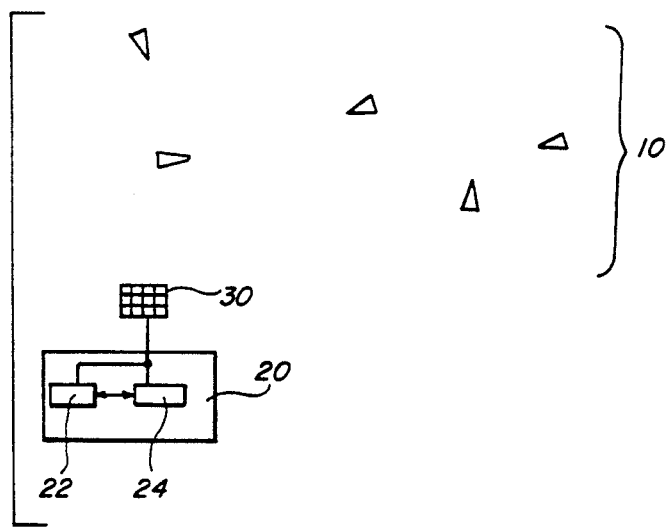
FIG. 1 is a schematic illustrating the environment in which the invention operates.

With reference to the drawing figures, like numbers indicating like parts throughout the several views, FIG. 1 illustrates the conditions in which the invention can operate. A platform 20 carries a radar antenna 30 which scans a plurality of objects 10, such as missiles, or aircraft. Platform 20 carries signal processing equipment 22, including a digital computer 24, of well known kinds (not shown) necessary for performing the steps set forth in FIG. 2.

Figure 2:
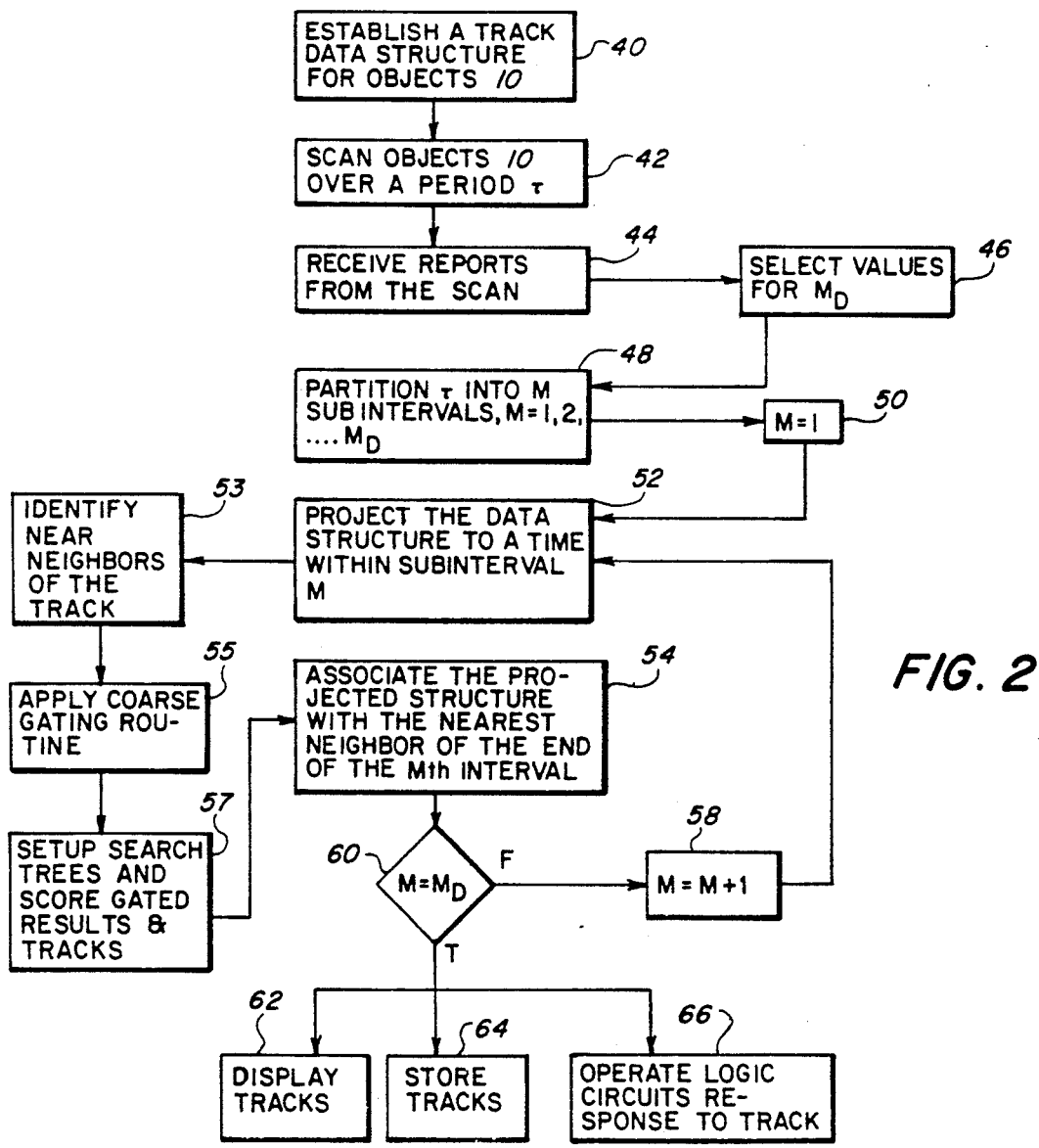
FIG. 2 is a flow diagram illustrating the operation of the invention.

FIG. 2 is a flow diagram illustrating the operation of the invention. Antenna 30 scans objects 10 and receives back reports from them, which are fed to equipment 22, and which forms a track data structure from the reports, as indicated at 40 in the flow diagram. One way to form an initial track data structure would be to take consecutive reports, match corresponding pairs and associate the reports using known techniques, however inefficient, and from the initial and associated reports calculate the velocity of each object in 10 (40 in FIG. 2). Thereafter, antenna 30 again scans objects 10 and receives another report (42, 44). The system, or the operator of the system, decides into how many partitions scan time $\tau$ will be divided ($M_D$ partitions: 46, 48), and copies the track data structure to a point within the first sub-interval (52). By copying, it is meant using the knowledge of the objects' position and velocity (or acceleration, etc., if available), to create a data structure representing to which each object would have traveled in parameter space at the point within the sub-interval. Identify near neighbors in time of the track, i.e. the reports which are closer in time to the point in the sub-interval than to any other sub-interval (53), apply a coarse gating criterion to all track-near neighbor pairs, set up conventional search trees or the like and score the gated pairs, and, based on this scoring, determine which reports correspond to which tracks, i.e. associate the near neighbor reports into the copied tracks (54). Thereafter, repeat this for each of the other sub-intervals (60), proceeding from earliest to latest sub-interval across the scan period $\tau$. Upon doing this, the track is associated across the time $\tau$, and platform 20 is ready to use the associated track, for example to display the track (62) as on a conventional plan position indicator, to store the data (64), or to use the associated track to operate other logic circuitry (60) such as anti-missile guidance control equipment or ground based automatic fire control. Because the data structure was copied to, and associate with near neighbors at plural sub-intervals, the necessary search radius in parameter space was correspondingly reduced for each integration, permitting the computational cost savings because the smaller radius results in a smaller number of gated pairs in each sub-interval. This, for any but a small number of objects 10, this saving offsets the added computational cost of making $M_D$ copies of the track, and setting up $M_D$ search structures, as discussed above.

Although the term search "radius" is used above, this does not mean that the search volumes must necessarily have circular symmetry. Radius here means any length in parameter space characteristic of the search volume's magnitude. In general, the volume V of any regular body in an l-dimensional space is given by $V = \lambda(l) R^L$, where R is this characteristic measure, and $\lambda$ is a scaling factor dependent on the class of surface (for example, spherical, elliptical, etc.) and dimension l. As an example, consider ellipsoidal surfaces, which are in fact commonly used in tracking. In the case of an ellipse, i.e. l=2, area V is given by $V = \pi ab = \pi(a/b)b^2$, where a and b are the semi-major and minor axes of the ellipse respectively. For all ellipses of the same eccentricity, a/b is a constant. Thus $\gamma(2) = \pi(a/b)$, and b is the characteristic "radius."

In a particular embodiment, the search structure chosen is the well-known BLD-enhanced k-d search tree. This search structure has the advantages of simplicity, and relative computational economy. The computational cost C for performing the steps in figure two using this tree for the step labeled 57 is:

$$C = [C_e M_D N_T] + [C_d M_D N_T \log N_T] + [C_{se} N_R (\log N_T + N_G)] + [C_{se} N_G N_R]$$

where $C_e$ is a scaling factor associated with the computational cost of one track copy, $C_d$ is a scaling factor associated with the cost of making one search tree of $N_T$ objects, $C_{se}$ is a scaling factor associated with the cost per report of searching the tree, and $N_G$ is the average number of gates resulting from whatever search radius was chosen. The terms in brackets from left to right correspond respectively to the cost of making the track copies over all sub-intervals of $\tau$, the cost of constructing the search trees, the cost of searching the trees, and the cost of scoring the gated track-report pairs.

If antenna 30 could scan instantaneously ($\tau = 0$), or it objects 10 moved so slowly that their positions virtually did not change position over a scan, the search radius to assure a given level of gating would have a value $R_0$. For many tracking problems of interest the opposite is true, and at least some of objects 10 will travel distances during the sub-intervals of $\tau$ much greater than $R_0$. Furthermore, in many tracking problems one knows (or can readily determine) the density $\rho$ of objects 10 in parameter space, and that this density is generally uniform. (For example, a large number of aircraft in holding patterns above a large airport, or a large dogfight of military aircraft.) Given $\rho$, and assuming that $(\alpha\tau)/(2M_D) >> R_0$, it can be shown that:

$$N_G = [(\rho\lambda)/2(l+1)][(\alpha\tau)/M_D]^L$$

Inserting this expression for Ne into the cost equation, above, one can show that the optimal number of copies $M_{DO}$ is given by:

$$M_{DO} = (lK_2/K_1)^{1/(L+1)}$$

$$K_1 = N_T(C_e C_d \log N_T)$$

$$K_2 = N_R(C_{sc} + C_{SE})[\gamma(1)p/(l+1)](a\tau/2)^L$$

Thus partitioning $\tau$ into $M_{DO}$ sub-intervals is particularly preferred.

The invention has been described in what is considered to be the most practical and preferred embodiments. It is recognized, however, that obvious modifications may occur to those with skill in this art. For example, although the discussion above discussed practicing the invention with radar, the invention is pertinent to any tracking, for example sonar. Accordingly, the scope of the invention is to be discerned solely by reference to the appended claims, wherein:

What is claimed is:

1. A method of tracking a plurality of objects comprising:

scanning said objects over a scan time $\tau$;
receiving reports of said objects responsive to said scan;
establishing a first and a second data structure, one said structure being a track data structure of said objects, the other said structure being said reports;
selecting an integer $M_D$;
partitioning said time $\tau$ into $M_D$ sub-intervals; and
projecting said first data structure to a time within at least two of said sub-intervals;
wherein, for each of said at least two of said sub-intervals:
determining the members of said second data structure that are nearest in time to said first data structure projected within said each of said at least two of said sub-intervals, said members being called near neighbors; and
associating said near neighbors with said first data structure within said each one of said at least two sub-intervals.

2. The method of claim 1, wherein said first data structure is said track data structure, said second data structure is said reports, and wherein said $M_D$ is chosen according to:

$$M_{DO} = (lK_2/K_1)^{1/(L+1)}$$

$$K_1 = N_T(C_e C_d \log N_T)$$

$$K_2 = N_R(C_{sc} + C_{SE})[\gamma(1)p/(l+1)](a\tau/2)^L.$$

3. The method of claim 2, wherein said method comprises a further step executed after said step for associating, said further step being selected from the group consisting of: displaying said first data structure in human readable form, storing said first data structure; operating logic circuity responsive to said first data structure.

4. The method of claim 1, wherein said method comprises a further step executed after said step for associating, said further step being selected from the group consisting of: displaying said first data structure in human readable form, storing said first data structure; operating logic circuity responsive to said first data structure.

5. A method of tracking a plurality of objects comprising:

a. scanning said objects over a scan time $\tau$;
b. receiving reports of said objects responsive to said scan;
c. establishing a first and a second data structure, one said structure being a track data structure of said objects, the other said structure being said reports;
d. selecting an integer $M_D$;
e. partitioning said time $\tau$ into $M_D$ sub-intervals; and
f. projecting said first data structure to a time within said sub-interval which is earliest in time;
g. determining the members of said second data structure that are nearest in time to said first data structure projected within of said sub-interval, said members being called near neighbors; and
h. associating said near neighbors with said first data structure within said sub-interval so as to create an updated first data structure; and
i. repeating steps (f) through (h) for each of said sub-intervals proceeding sequentially through said sub-intervals from the earliest to the latest, said step for projecting using the then current update of said first data structure.

6. The method of claim 5, wherein said first data structure is said track data structure, said second data structure is said reports, and wherein said $M_D$ is chosen according to:

$$M_{DO} = (lK_2/K_1)^{1/(L+1)}$$

$$K_1 = N_T(C_e C_d \log N_T)$$

$$K_2 = N_R(C_{sc} + C_{SE})[\gamma(1)p/(l+1)](a\tau/2)^L.$$

7. The method of claim 6, wherein said method comprises a further step executed after said step for associating, said further step being selected from the group consisting of: displaying said first data structure in human readable form, storing said first data structure; operating logic circuity responsive to said first data structure.

8. The method of claim 5, wherein said method comprises a further step executed after said step for associating, said further step being selected from the group consisting of: displaying said first data structure in human readable form, storing said first data structure; operating logic circuity responsive to said first data structure.

9. Apparatus for tracking a plurality of objects comprising:

means for scanning said objects over a scan time $\tau$;
means for receiving reports of said objects responsive to said scan;
means for establishing a first and a second data structure, one said structure being a track data structure of said objects, the other said structure being said reports;
means for selecting an integer $M_D$;
means for partitioning said time $\tau$ into $M_D$ sub-intervals; and
means for projecting said first data structure to a time within at least two of said sub-intervals;
wherein, said apparatus further comprises
means for determining, for each of said at least two of said sub-intervals, the members of said second data structure that are nearest in time to said first data structure projected within said each of said at least two of said sub-intervals, said members being called near neighbors; and means for associating said near neighbors with said first data structure within said each one of said at least two sub-intervals.

10. The apparatus of claim 9, wherein said first data structure is said track data structure, said second data structure is said reports, and wherein said means for partitioning is effective to select $M_D$ according to:

$$M_{DO}=(lK_2/K_1)^{1/(L+1)}$$

$$K_1=N_T(C_eC_d\log N_T)$$

$$K_2=N_R(C_{sc}+C_{SE})[\gamma(1)p/(l+1)](a\tau/2)^L$$

11. The apparatus of claim 10, wherein said apparatus comprises a further element selected from the group consisting of: means for displaying said first data structure in human readable form, means for storing said first data structure, means for operating logic circuity responsive to said first data structure.

12. The apparatus of claim 9, wherein said apparatus comprises a further element selected from the group consisting of: means for displaying said first data structure in human readable form, means for storing said first data structure, means for operating logic circuity responsive to said first data structure.

13. A apparatus for tracking a plurality of objects comprising:
   a. means for scanning said objects over a scan time $\tau$;
   b. means for receiving reports of said objects responsive to said scan;
   c. means for establishing a first and a second data structure, one said structure being a track data structure of said objects, the other said structure being said reports;
   d. means for selecting an integer $M_D$;
   e. means for partitioning said time $\tau$ into $M_D$ sub-intervals; and
   f. means for projecting said first data structure to a time within said sub-interval which is earliest in time;
   g. means for determining the members of said second data structure that are nearest in time to said first data structure projected within of said sub-interval, said members being called near neighbors;
   h. means for associating said near neighbors with said first data structure within said sub-interval so as to create an updated first data structure; and
   i. wherein said apparatus is adapted, for each of said sub-intervals proceeding sequentially through said sub-intervals from the earliest to the latest, to cooperate to cause said apparatus for projecting to operate using the then current update of said first data structure.

14. The apparatus of claim 13, wherein said first data structure is said track data structure, said second data structure is said reports, and wherein said $M_D$ is selected according to:

$$M_{DO}=(lK_2/K_1)^{1/(L+1)}$$

$$K_1=N_T(C_eC_d\log N_T)$$

$$K_2=N_R(C_{sc}+C_{SE})[\gamma(1)p/(l+1)](a\tau/2)^L.$$

15. The apparatus of claim 14, wherein said apparatus comprises a further element selected from the group consisting of: means for displaying said first data structure in human readable form, means for storing said first data structure, means for operating logic circuity responsive to said first data structure.

16. The apparatus of claim 13, wherein said apparatus comprises a further element selected from the group consisting of: means for displaying said first data structure in human readable form, means for storing said first data structure, means for operating logic circuity responsive to said first data structure.

* * * * *